(12) United States Patent
Wang

(10) Patent No.: US 8,948,247 B2
(45) Date of Patent: Feb. 3, 2015

(54) SYSTEM AND METHOD FOR PROCESSING VIDEO FILES

(75) Inventor: Ye-Kui Wang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 963 days.

(21) Appl. No.: 12/754,896

(22) Filed: Apr. 6, 2010

(65) Prior Publication Data

US 2010/0259690 A1 Oct. 14, 2010

Related U.S. Application Data

(60) Provisional application No. 61/169,247, filed on Apr. 14, 2009.

(51) Int. Cl.

| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/597* | (2014.01) |
| *H04N 21/2343* | (2011.01) |
| *H04N 21/462* | (2011.01) |
| *H04N 21/6587* | (2011.01) |
| *H04N 21/845* | (2011.01) |
| *H04N 21/854* | (2011.01) |

(Continued)

(52) U.S. Cl.
CPC . *H04N 19/00769* (2013.01); *H04N 21/234327* (2013.01); *H04N 21/4621* (2013.01); *H04N 21/6587* (2013.01); *H04N 21/8451* (2013.01); *H04N 21/85406* (2013.01); *H04N 19/00884* (2013.01); *H04N 19/00781* (2013.01); *H04N 19/00472* (2013.01)
USPC .................................................. 375/240.01

(58) Field of Classification Search
USPC .................................................. 375/240.26
See application file for complete search history.

(56) References Cited

U.S. PATENT DOCUMENTS

| | | | |
|---|---|---|---|
| 5,944,792 | A | 8/1999 | Yamato et al. |
| 7,650,036 | B2 | 1/2010 | Lei et al. |

(Continued)

FOREIGN PATENT DOCUMENTS

| | | |
|---|---|---|
| CN | 1802858 A | 7/2006 |
| CN | 101129073 A | 2/2008 |

(Continued)

OTHER PUBLICATIONS

"Series H: Audiovisual and Multimedia Systems Infrastructure of audiovisual services-coding of moving video," Advanced video coding for generic audiovisual services, ITU-T H.264 Telecommunication Standardization Sector of ITU, Mar. 2009, 670 pages.

(Continued)

*Primary Examiner* — Mehrdad Dastouri
*Assistant Examiner* — Kristin Dobbs
(74) *Attorney, Agent, or Firm* — Slater & Matsil, L.L.P.

(57) ABSTRACT

In accordance with an embodiment, a method of operating a video server includes receiving a first video bitstream, storing the first bitstream in a memory, generating a second video bitstream from the first video bitstream, and storing the second video bitstream in the memory. The first video bitstream has a plurality of independently coded views and the second video bitstream has one of the plurality of independently coded views.

19 Claims, 1 Drawing Sheet

(51) Int. Cl.
  *H04N 19/70* (2014.01)
  *H04N 19/61* (2014.01)
  *H04N 19/40* (2014.01)

(56) References Cited

U.S. PATENT DOCUMENTS

| | | | | |
|---|---|---|---|---|
| 7,782,937 | B2* | 8/2010 | Yun et al. | 375/240.01 |
| 8,059,939 | B2* | 11/2011 | Sasaki et al. | 386/284 |
| 8,471,893 | B2* | 6/2013 | Kim et al. | 348/42 |
| 2005/0078108 | A1* | 4/2005 | Swift et al. | 345/419 |
| 2006/0153462 | A1 | 7/2006 | Ridge et al. | |
| 2006/0221178 | A1 | 10/2006 | Yun et al. | |
| 2006/0233247 | A1 | 10/2006 | Visharam et al. | |
| 2007/0056000 | A1 | 3/2007 | Pantalone et al. | |
| 2007/0122045 | A1 | 5/2007 | Wu | |
| 2008/0089412 | A1* | 4/2008 | Ugur et al. | 375/240.12 |
| 2008/0310499 | A1* | 12/2008 | Kim et al. | 375/240.01 |
| 2009/0163185 | A1* | 6/2009 | Lim et al. | 455/414.1 |
| 2009/0268816 | A1* | 10/2009 | Pandit et al. | 375/240.12 |
| 2010/0259595 | A1* | 10/2010 | Trimeche et al. | 348/43 |
| 2010/0259596 | A1 | 10/2010 | Park et al. | |
| 2010/0262628 | A1 | 10/2010 | Singer | |
| 2011/0103765 | A1 | 5/2011 | Hattori | |

FOREIGN PATENT DOCUMENTS

| | | |
|---|---|---|
| CN | 101263716 A | 9/2008 |
| CN | 102224733 B | 3/2014 |
| JP | 9190293 A | 7/1997 |
| JP | 2002-232912 A | 8/2002 |
| JP | 2003-346183 A | 12/2003 |
| JP | 2005-124200 A | 5/2005 |
| JP | 2007-156961 A | 6/2007 |
| JP | 1976450 A | 6/2007 |
| KR | 20100113338 A | 10/2010 |
| KR | 201101389408 A | 12/2011 |
| KR | 20120006432 A | 1/2012 |
| WO | WO2007/024275 | 3/2007 |
| WO | WO2008/084424 | 7/2008 |
| WO | WO 2008/156318 A2 | 12/2008 |

OTHER PUBLICATIONS

International Search Report and Written Opinion, International Application No. PCT/CN2010/071764, Date of mailing Jul. 22, 2010, 10 pages.

Japanese Patent Application No. 2012-505036, Notice of Reasons for Rejection mailed Oct. 23, 2012, 7 pgs.

Wang, A Proposal to MVC File Format, International Organisation for Standardisation Organisation Internationale de Normalisation ISO/IEC/JTC1/SC29/WG11 Coding of Moving Pictures and Audio, ISO/IEC/JTC1/SC29/WG11, MPEG2009/M16445, Apr. 2009, Huawei Technologies, 4 pages.

"Information Technology-Coding of audio-visual objects-Part 15: Advanced Video Coding (AVC) file format, Amendment 3: File format support for Multiview Video Coding," ISO/IEC JTC 1/SC 29, ISO/IEC 14496-15:2004/FPDAM 3, ISO/IEC JTC 1/SC 29/WG 11, Feb. 22, 2009; 47 pages.

Segall, "CE8: SVC-to-AVC Bit-stream Rewriting for Coarse Grain Scalability," Sharp Labs of America, Joint Video Team (JVT) of ISO/IEC MPEG & ITU-T VCEG (ISO/IEC JTC/SC29/WG11 and ITU-T SG16 Q.6), 21$^{st}$ Meeting: Hangzhou, China, Oct. 20-27, 2006, 8 pages.

Sullivan et al., "Editors' draft revision to ITU-T Rec. H.264/ISO/IEC 14496-10 Advanced Video Coding—in preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30$^{th}$ Meeting: Geneva, CH, Jan. 29-Feb. 3, 2009, 683 pages.

"Information technology—Coding of audio-visual objects—Part 15: Advanced Video Coding (AVC) file format, Amendment 2: File format support for Scalable Video Coding," ISO/IEC JTC 1/SC 29, ISO/IEC 14496-15:2004/FDAM 2:2008(E); ISO/IEC JTC 1/SC 29/WG 11; Mar. 10, 2008, 44 pages.

Amon et al., "File Format for Scalable Video Coding," IEEE Transactions on Circuits and Systems for Video Technology, vol. 17, No. 9, Sep. 2007, 12 pages.

European Communication dated Nov. 7, 2011, Application Serial No. 10764099.7-1247 PCT/CN2010071764, Huawei Technologies Co., Ltd., 11 pages.

Notice of Allowance received in Korean Patent Apllicaiton No. 10-2011-7022136 mailed Apr. 11, 2013, 3 pages.

Partial Translation of the Second Chinese Office Action of Chinese Application No. 201080006517.1, dated Dec. 11, 2012, 12 pages.

Third Chinese Office Action with Partial English Translation received in Chinese Patent Application No. 201080006517.1 mailed Jun. 18, 2013, 12 pages.

* cited by examiner

SYSTEM AND METHOD FOR PROCESSING VIDEO FILES

CROSS REFERENCE TO RELATED APPLICATIONS

This patent application claims priority to U.S. Provisional Application No. 61/169,247 filed on Apr. 14, 2009, entitled "Storage of Transcoded Subsets of Scalable or Multi-View Video Contents," which application is incorporated by reference herein in its entirety.

TECHNICAL FIELD

The present invention relates generally to computer systems, and more particularly to a system and method for processing video files.

BACKGROUND

The transmission of video signals via computer networks has become more pervasive as the Internet has become faster and more ubiquitous. Consequently, more video content providers are choosing to distribute videos online rather than selling and renting Digital Video Discs in traditional retail outlets. As the picture quality and resolution of electronically distributed videos improve, however, the amount of processing required by computer video distribution networks has correspondingly increased.

One factor that has increased the amount of video processing is multi-view video content. For example, a multi-view video bitstream may contain two views: one designated for the right eye and one designated for the left eye. Multi-view video techniques are also used in situations where it is useful to have multiple (more than two) views, for example, a sporting event or a live play. Such multi-view video content is implemented by encoding multiple views in the same video bitstream, using, for example a multi-view coding standard such as Multi-view Video Coding (MVC), which is the multi-view extension of the H.264/AVC, specified in Annex H of the H.264/AVC specification. Another factor that has increased the amount of video processing is scalable video content, wherein different qualities, frame rates, and/or spatial resolutions, both standard definition (SD) and high definition (HD) video signals, can be represented in the same video bitstream.

One of the consequences of having multi-view and/or scalable video contents is that the transmission and reception of such contents can be very bandwidth and processing intensive. Furthermore, not all clients who receive such video content require all of the content of the transmitted video signals. For example, a user with a single standard resolution monitor does not need all of the features provided by HD or three dimensional video signals.

What are needed are systems and methods to more efficiently deliver video content to clients.

SUMMARY OF THE INVENTION

In accordance with an embodiment, a method includes storing a video file comprising a first bitstream of a first format and a second bitstream of a second format. The first bitstream comprises a plurality of independently coded video components, and the second bitstream comprises one of the plurality of independently coded video components. The method also includes choosing the one of the plurality of independently coded video components and identifying a track storing the second bitstream.

In accordance with an embodiment, a method of operating a video server includes receiving a first video bitstream, storing the first bitstream in a memory, generating a second video bitstream from the first video bitstream, and storing the second video bitstream in the memory. The first video bitstream has a plurality of independently coded views and the second video bitstream has one of the plurality of independently coded views.

In accordance with another embodiment, a video server has a memory and a processor. The processor is configured to receive a first video bitstream having a first independently coded view and a second independently coded view and generate a second video bitstream having the second independently coded view from the first video bitstream. The processor stores the first and second video bitstream in the memory.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for processing video files. Embodiments of this invention may also be applied to systems and methods directed toward other types of data communication.

Figure 1:
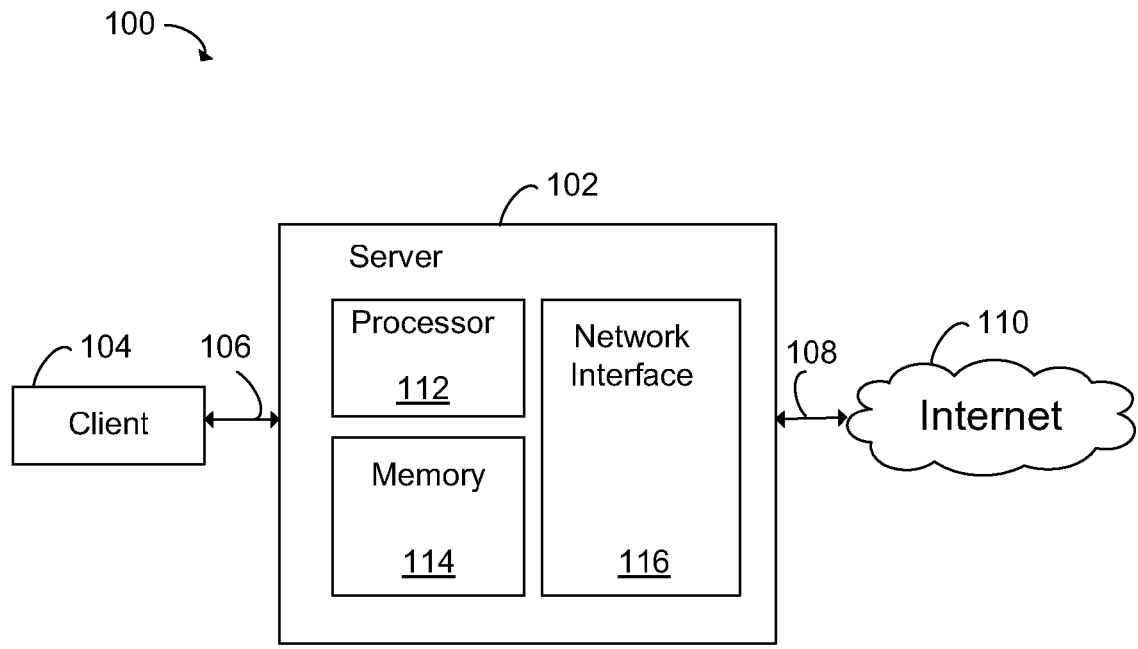
FIG. 1 illustrates a diagram of an embodiment video server system.

FIG. 1 illustrates embodiment video distribution system 100. Client 104 is coupled to server 102 via connection 106. Only one client 104 is shown for ease of illustration, but more than one client can be connected to server 102 in embodiments. Server 102 has processor 112, network interface 116 and memory 114. In some embodiments, server 102 is coupled to further networks, for example, Internet 110, via connection 108. In some other embodiments, Internet 110 and connection 108 are a part of connection 106. In embodiments, server 102 stores video content or part thereof in memory 114. Memory 114 is made of disc drive arrays in an embodiment, however, memory 114 can encompass other forms of storage, for example, solid state memory such as DRAM, and SRAM, other kinds of magnetic storage, or other forms of memory storage. Server 102 can be, for example, a remotely located server ran by a service provider in a wide area or metropolitan network, a local area network server, or another type of server. Connections 106 and 108 can be wireline, wireless, DSL and/or other types of connections. Furthermore, connections 106 and 108 can be run according to TCP-IP, UDP-IP or other kinds of protocols.

Figure 2:
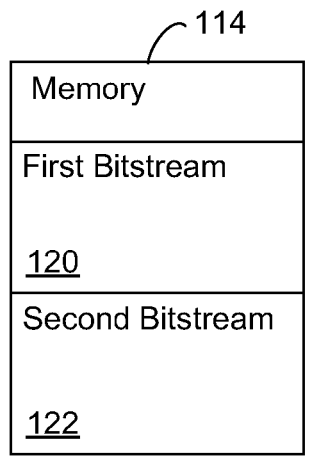
FIG. 2 illustrates an embodiment memory allocation.

FIG. 2 illustrates an embodiment allocation of memory 114 of server 102. (FIG. 1.) In an embodiment of the present invention, first video bitstream 120 and second video bitstream 112 are stored in memory 114. In an embodiment, first video bitstream 120 has one or more independently coded views and the second video bitstream 122 has a single independently coded view.

In an embodiment, first bitstream 120 has at least two video components. A first video component is refereed to as an "A-view." In embodiments, this "A-view" is an independently coded in first bitstream 120. First bitstream 122 also has at least one further video component, the first of which is referred to as a "B-view." In some cases, the "B-view" is not independently coded from the "A-view," for example, in cases, such as 3-D video, where the "B-view" is closely correlated with the "A-View." In such cases, "B-View" information may be made of coded differences from the "A-View" rather than coding the "B-View" in its entirety. In some embodiments, however, the "B-View" is independently coded, for example, when first bitstream 120 is carrying multiple views of a play, performance, or sporting event. For example, the "A-View" might represent a bird's eye view of a race track, and the "B-View" might represent an in-car view of an auto race. In further embodiments, first bitstream 120 has more than two views, for example, further including a "C-View," "D-View" and so on. These additional views can be dependent or independent of the "A-View."

In one embodiment, the "A-View," and at least one further view, for example, the "B-View" are independently coded views. For the sake of simplicity of explanation, it will be assumed that the "B-View" is independently coded. It should be understood that other views besides the "B-View" can be independently coded, so whenever a reference is made to the "B-View," other views can be considered as well. For example, in one embodiment, the "B-View" is a dependent view and the "C-View" is an independent view.

In an embodiment, server 102 takes first bitstream having at least two independent views, and creates second bitstream 122 that contains a single view. In an embodiment, the view encoded in the second bitstream is an independently coded view other than the "A-View." In further embodiments, the second bitstream can contain the "A-View" or any independently or dependently coded views.

In an embodiment, the server receives first bitstream 120 from connection 108, however, the first bitstream can also be written into memory locally by a user, for example, in cases where a user copies a DVD video directly without a network. Second bitstream 122 is generated and written soon after server 102 receives first bitstream 120 for later retrieval by client 104. Alternatively, second bitstream 122 can be generated at a later time, for example, in response to a request for an alternate by client 104 or other clients.

In an embodiment, a processor 112 transcodes subsets of compressed scalable or multi-view video contents, including a mapping of a track for transcoded layer or view to the track for the original layer or view. In one embodiment, server 102 does not implement the transcoding functionality to provide a standard conforming scalable or multi-view bitstream corresponding to a subset of the original bitstream, where the subset does not depend on the base layer or base view. Rather server 102 creates second bitstream 122 having a single bitstream in some embodiments.

In some embodiments, multi-view and single-view bitstreams are formatted according to the H.264/AVC standard, which is also known as ITU-T Recommendation H.264 and ISO/IEC International Standard (IS) 14496-10. This standard was developed by the Joint Video Team (JVT) of the ISO/IEC Motion Picture Experts Group (MPEG) and ITU-T Video Coding Experts Group (VCEG). Scalable Video Coding (SVC) is the scalable extension of H.264/AVC, specified in Annex G of the H.264/AVC spec, and Multi-view Video Coding (MVC) is the multi-view extension of the H.264/AVC, specified in Annex H of the H.264/AVC spec. In alternative embodiments, other standards, such as ISO/IEC IS 13818-2 can also be used.

In SVC-based embodiments, a portion of a bitstream is extracted, decoded, and presented with a lower spatial resolution, a lower quality, or a lower frame rate. An SVC bitstream has one base layer and a number of enhancement layers. The base layer bitstream subset is backward compatible to one or more of the non-scalable profiles earlier specified in Annex A of the H.264/AVC spec. In some embodiments, an enhancement layer uses a lower layer for inter-layer prediction for improved coding efficiency. For simplicity, this disclosure also refers to an enhancement layer as a non-base layer.

An embodiment MVC bitstream, on the other hand, has one or more encoded views captured, for example, by multiple cameras. In alternative embodiments, these encoded views can have different video content from different sources. A portion of the bitstream is extracted and decoded to represent a subset of the views represented by the entire bitstream. One of the views in an MVC bitstream is the base view, for which the bitstream subset is backward compatible to one or more of the non-scalable profiles earlier specified in Annex A of the H.264/AVC spec. Other views are referred to as non-base views. A non-base view may use another view for improved coding efficiency in some embodiments.

For simplicity, a bitstream or decoder compliant or conforming or compatible to or with a profile specified in Annex A of the H.264/AVC spec is referred to as compliant or conforming or compatible to or with H.264/AVC, a bitstream or decoder compliant or conforming or compatible to or with a profile specified in Annex G of the H.264/AVC spec is referred to as compliant or conforming or compatible to or with SVC, and a bitstream or decoder compliant or conforming or compatible to or with a profile specified in Annex H of the H.264/AVC spec is referred to as compliant or conforming or compatible to or with MVC.

In embodiment SVC or MVC implementations, a non-base layer or view may or may not depend on other layers or views. One example of a non-base layer or view not dependent on other views is when all layers or views are independent from each other. Another example is when a subset of the non-base layers or views is independent from all other layers or views, and where dependency exists within the subset. In such a case there is at least one layer or view in the subset that does not depend on any other layers or views.

In an embodiment, a receiver issues a request to play one independently coded subset of non-base layers or views. When the number of non-base layers or views in the independent subset is one, the receiver can use a decoder compliant to H.264/AVC, or compliant to SVC or MVC. In both cases, the extracted bitstream subset for the requested non-base layer or view is transcoded to comply with H.264/AVC. One reason why in the latter case (i.e. when the receiver has a decoder compliant to SVC or MVC) the non-base view or layer is also transcoded to comply with H.264/AVC is that, in SVC or MVC, a conforming bitstream may be needed to contain a base layer or view that is compliant to H.264/AVC. Therefore, when an independent subset of non-base layers or view is extracted, the independent non-base layer or view within the subset is transcoded to be compliant to H.264/AVC. When the number of non-base layers or views in the independent subset is greater than one, the receiver uses decoder compliant to SVC MVC. Therefore, to generate a bitstream having the subset of layers or views, the independent non-base layer or view within the subset is transcoded to comply with H.264/AVC.

In one embodiment, transcoding an independent non-base layer to H.264/AVC compliant is described in sub-clause G.13.2.1 of the H.264/AVC specification, semantics of the syntax element conversion_type_idc[i], when conversion_type_idc[i] is equal to 2.

In an embodiment, a method of transcoding an independent non-base view in an independent subset of non-base views to a H.264/AVC compliant representation is accomplished according to a method described in subclause H.8.5.5 of the H.264/AVC specification.

In an embodiment, in responding to a receiver's request for one independently coded subset of non-base layers or views, a video server performs the transcoding, for example, as specified in the examples above, and sends the transcoded bitstream to the receiver. However, for reduced complexity and cost, some servers may not be equipped with such transcoding capabilities. To enable such application scenarios, in some embodiments, a mechanism stores a transcoded bitstream in a media file such that the server directly chooses a desired track in the file and sends the elementary stream to the receiver.

The ISO base media file format is specified in ISO/IEC IS 14496-12, which is widely used for storage of multimedia contents. A family of file format standards or draft standards, including MPEG-4 file format (ISO/IEC IS 14496-14), H.264/AVC file format (ISO/IEC IS 14496-15), SVC file format (ISO/IEC IS 14496-15 Amendment 2) and MVC file format (ISO/IEC IS 14496-15 Amendment 3) are derived based on the ISO base media file format in some embodiment.

In an embodiment, a method based on the draft MVC file format in MPEG output document W10445, the 87th MPEG meeting in Lausanne, Switzerland, February 2009, is used, which is incorporated herein by reference. In this embodiment, a new box, named VirtualBaseViewTracks box, is specified. The VirtualBaseViewTracks box is included in the Multi-view Information box, which is included in the Media Information box of the track containing the base view of the multi-view stream stored in the file.

The new box is specified as follows. The Box Type is set to "vbvt". The container of the new box is a Multi-view Information box (nave). The new box is optional in some embodiments. The new box provides information of tracks storing virtual base views for independently coded non-base views. In an embodiment, for any independently coded non-base view, a virtual base view is an H.264/AVC compatible representation of the view, and can be created by the process specified in subclause H.8.5.5 of the H.264/AVC spec. Samples containing data units of an independently coded non-base view and samples of the virtual base view are aligned by decoding times.

The following syntax specifies the format of the new box and what information the new box VirtualBaseViewTracks contains.

```
aligned(8) class VirtualBaseViewTracksBox( ) extends FullBox('vbvt',
version = 0, flags){
    unsigned int(16) num_entries;
    for(i=0; i<num_entries; i++) {
        unsigned int(8) entry_type;
        unsigned int(32) track_id;
        if (entry_type == 1)
            unsigned int(16) tier_id;
        unsigned int(32) vbv_track_id;
    }
}
```

In the embodiment syntax listed above, the semantics of the syntax elements are as follows:

num_entries is the number of tracks or tiers for which the tracks containing the virtual base views are identified;
entry_type indicates which type of a track or tier follows. The following values of entry_type are specified:
    0 - an entire track. In this case, the track identified by track_id contains only an independently coded non-base view, and
    1 - a tier within a track. In this case, the tier identified by track_id and tier_id contains only an independently coded non-base view;
track_id indicates a track;
tier_id indicates a tier within a track; and
vbv_track_id indicates a track that contains the virtual base view for the view identified by track_id (when entry_type is equal to 0) or by track_id and tier_id (when entry_type is equal to 1).

In an embodiment, the VirtualBaseViewTracks box provides, for each independently coded non-base view (or a temporal subset of it), the track identifier of the track containing the virtual base view (or a temporal subset of it) that is H.264/AVC compliant and that is created, for example, according to the process specified in sub-clause H.8.5.5 of the H.264/AVC specification. When a subset of non-base views is to be extracted and decoded, then the view with the smallest view order index among the subset of views is an independently coded non-base view (otherwise more views need to be extracted). In this case, for the view with the smallest view order index, the data units are taken from the corresponding virtual base view track. Data units for other views are taken as usual, from the original track(s). If the number of views in the subset of non-base views to be extracted and decoded is one, (i.e., only one independently coded non-base view is to be extracted and decoded), the virtual view is directly taken.

In another embodiment of the present invention, another method based on the draft MVC file format in MPEG output document W10445, the 87th MPEG meeting in Lausanne, Switzerland, February 2009, is used. In this method, instead of defining a new box, a new track reference type of 'vbvt' is defined. In embodiment, any track containing a virtual base view includes a track reference of type 'vbvt' referring to the source track containing the corresponding independently coded non-base view. With this new track reference type, a server identifies the file track containing the virtual base view of an independently coded non-base view, and when the independently coded non-base view is requested by a client, the server then sends the media data contained in the identified track to the client.

In a further embodiment, a new box or a new track reference type is used to apply to scalable video contents. Such a new box or a new track reference type provides a similar functionality as above for multi-view video content, but herein for scalable video content, when a non-base layer is requested by a client.

In an embodiment, a method includes storing a video file comprising a first bitstream of a first format and a second bitstream of a second format. The first bitstream comprises a plurality of independently coded video components, and the second bitstream comprises one of the plurality of independently coded video components. The method also includes choosing the one of the plurality of independently coded video components and identifying a track storing the second bitstream. In some embodiments, the method further includes transmitting the second bitstream to a client. In further embodiments, each of the plurality of independently coded video components include an independently coded view and/or an independently coded layer.

In an embodiment, the first format is a Multiview Video Coding (MVC) format according to a profile specified in Annex H of the H.264/AVC video coding standard, and the second format is an Advanced Video Coding (AVC) format according to a profile specified in Annex A of the H.264/AVC video coding standard. In another embodiment, first format is a Scalable Video Coding (SVC) format according to a profile specified in Annex G of the H.264/AVC video coding standard, and the second format comprises an Advanced Video Coding (AVC) format according to a profile specified in Annex A of the H.264/AVC video coding standard. In some embodiments, the video file is stored according to a Multiview Video Coding (MVC) file format, or according to a Scalable Video Coding (SVC) file format. In further embodiments, other formats can be used.

According to embodiment identifying a track storing the second bitstream includes using information from the video file, wherein the information from the video file is indicative of the track storing the second bitstream. In some embodiments, the information from the video file indicative of the track storing the second bitstream comprises a box containing information of the track storing the second bitstream and/or a track reference indicative of information of the track storing the second bitstream.

In an embodiment, a method of operating a video server includes receiving a first video bitstream, where the first video bitstream includes a plurality of independently coded views. The method further includes storing the first bitstream in a memory, generating a second video bitstream from the first video bitstream, and storing the second video bitstream in the memory. The second video bitstream comprises one of the plurality of independently coded views. In an embodiment, the method further includes transmitting the second bitstream to a client. In further embodiments, the method also includes receiving a request for the one of the plurality of bitstreams from the client, where the transmitting is performed in response to receiving the request. Some embodiments include generating a third video bitstream from the first video bitstream, where the third video bitstream includes another one of the plurality of independently coded views, and storing the third video bitstream in the memory. In some embodiments, the second video bitstream is stored in a same file as the first bitstream.

In some embodiments, the second bitstream is coded in a different format from the first bitstream. In one example, the first bitstream is encoded in a multi-view video coding (MVC) format; and the second bitstream is encoded in a scalable video coding (SVC) format. In some embodiments, the plurality of independently coded views comprise an A-view and at least one further independently coded view, and the one of the plurality of independently coded views in the second bitstream comprises the at least one further independently coded view.

In an embodiment, a video server includes a memory; and a processor, wherein the processor is configured to receive a first video bitstream having a first independently coded view and a second independently coded view. The processor is further configured to store the first bitstream in the memory, generate a second video bitstream from the first video bitstream, and store the second video bitstream in the memory. The second video bitstream includes the second independently coded views. In some embodiments, the video server is configured to transmit the second bitstream. In further embodiments, the video server is configured to transmit the second bitstream to a client in response to a request for the second video stream.

In an embodiment, the second bitstream is coded in a different format from the first bitstream. In one example, the first bitstream is encoded in a multiview video coding (MVC) format; and the second bitstream is encoded in a scalable video coding (SVC) format. In a further embodiment, the first independently coded views comprises an A-view and the second independently coded view comprises a B-view.

In an embodiment, a method of distributing video data includes providing a first video bitstream, where the first video bitstream includes a first independently coded view and a second independently coded view. The method also includes generating a second video bitstream from the first video bitstream and storing the second video bitstream in a memory, where the second video bitstream includes the second independently coded view. In embodiment, the method further includes transmitting the second bitstream to a client. In some embodiments, transmitting the second bitstream to the client is performed in response to a request from the client for the second independently coded view.

In some embodiments, generating is performed by a processor. In further embodiments, providing the first video bitstream includes receiving the first video bitstream from a computer network. In some embodiments of the video server, the first bitstream is encoded in a multiview video coding (MVC) format, and the second bitstream is encoded in a scalable video coding (SVC) format.

In some embodiments, embodiment algorithms can be implemented using a computer program or software running on a processor.

Advantages of embodiments that create a single view bitstream from a multi-view bitstream is the ability to provide secondary views to clients without having to perform transcoding operations each time the view is requested.

A further advantage of embodiments is that the client node requesting the secondary view does not have to support or perform multi-view decoding algorithms, and does not have to allocate processing resources to multi-view decoding. This allows lower power and/or lower performance clients such as smart-phones and netbooks, to access full featured video content without having to expend processing resources extracting views from multi-view bitstreams.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
    storing a video file in a memory of a video server that lacks transcoding capability, the video file comprising a first bitstream having a Multiview Video Coding (MVC) compatible format, wherein the first bitstream having the MVC compatible format comprises a plurality of independently coded video components, and wherein the first bitstream having the MVC compatible format includes at least one non-base view having an Advanced Video Coding (AVC) compatible format;
    choosing one of the plurality of independently coded video components of the first bitstream; and
    identifying a track storing a second bitstream having an AVC compatible format,
    wherein the MVC compatible format is a format compatible with a profile specified in Annex H of the H.264/AVC video coding standard, and the AVC compatible format is a format that is compatible with a profile specified in Annex A of the H.264/AVC video coding standard.

2. The method of claim 1, further comprising transmitting the second bitstream to a client.

3. The method of claim 1, wherein each of the plurality of independently coded video components comprise an independently coded view.

4. The method of claim 1, wherein each of the plurality of independently coded video components comprise an independently coded layer.

5. The method of claim 1, wherein identifying a track storing the second bitstream comprises using information from the video file, wherein the information from the video file is indicative of the track storing the second bitstream.

6. The method of claim 5, wherein the information from the video file indicative of the track storing the second bitstream comprises a box containing information of the track storing the second bitstream.

7. The method of claim 5, wherein the information from the video file indicative of the track storing the second bitstream comprises a track reference indicative of information of the track storing the second bitstream.

8. An apparatus comprising:
    a processor; and
    a computer readable storage medium storing programming for execution by the processor, the programming including instructions to:
        store a video file in a memory of a video server that lacks transcoding capability, the video file comprising a first bitstream having a Multiview Video Coding (MVC) compatible format, wherein the first bitstream having the MVC compatible format comprises a plurality of independently coded video components, and wherein the first bitstream having the MVC compatible format includes at least one non-base view having an Advanced Video Coding (AVC) compatible format;
        select one of the plurality of independently coded video components of the first bitstream; and
        identify a track storing a second bitstream having an AVC compatible format, wherein the MVC compatible format is a format compatible with a profile specified in Annex H of the H.264/AVC video coding standard, and the AVC compatible format is a format that is compatible with a profile specified in Annex A of the H.264/AVC video coding standard.

9. The apparatus of claim 8, wherein each of the plurality of independently coded video components comprise an independently coded view.

10. The apparatus of claim 8, wherein each of the plurality of independently coded video components comprise an independently coded layer.

11. The apparatus of claim 8, wherein the track is identified using information from the video file, wherein the information from the video file is indicative of the track storing the second bitstream.

12. The apparatus of claim 11, wherein the information from the video file indicative of the track storing the second bitstream comprises a box containing information of the track storing the second bitstream.

13. The apparatus of claim 11, wherein the information from the video file indicative of the track storing the second bitstream comprises a track reference indicative of information of the track storing the second bitstream.

14. A computer program product comprising a computer readable storage medium storing programming, the programming including instructions to:
    store a video file in a memory of a video server that lacks transcoding capability, the video file comprising a first bitstream having a Multiview Video Coding (MVC) compatible format, wherein the first bitstream having the MVC compatible format comprises a plurality of independently coded video components, and wherein the first bitstream having the MVC compatible format includes at least one non-base view having an Advanced Video Coding (AVC) compatible format;
    select one of the plurality of independently coded video components of the first bitstream; and
    identify a track storing a second bitstream having an AVC compatible format, wherein the MVC compatible format is a format compatible with a profile specified in Annex H of the H.264/AVC video coding standard, and the AVC compatible format is a format that is compatible with a profile specified in Annex A of the H.264/AVC video coding standard.

15. The computer program product of claim 14, wherein each of the plurality of independently coded video components comprise an independently coded view.

16. The computer program product of claim 14, wherein each of the plurality of independently coded video components comprise an independently coded layer.

17. The computer program product of claim 14, wherein the track is identified using information from the video file, wherein the information from the video file is indicative of the track storing the second bitstream.

18. The computer program product of claim 17, wherein the information from the video file indicative of the track storing the second bitstream comprises a box containing information of the track storing the second bitstream.

19. The computer program product of claim 17, wherein the information from the video file indicative of the track storing the second bitstream comprises a track reference indicative of information of the track storing the second bitstream.

* * * * *